United States Patent [19]
Vaughn

[11] Patent Number: 4,483,241
[45] Date of Patent: Nov. 20, 1984

[54] COMBINATION ROTISSERIE-SHISH KEBAB ACCESSORY

[75] Inventor: William T. Vaughn, Indianapolis, Ind.

[73] Assignee: Jenn-Air Corporation, Indianapolis, Ind.

[21] Appl. No.: 423,529

[22] Filed: Sep. 27, 1982

[51] Int. Cl.³ .............................................. A47J 37/04
[52] U.S. Cl. .................................. 99/421 H; 99/447;
99/449; 126/9 R; 126/9 B; 126/27; 126/41 B;
211/189; 211/200; 248/150
[58] Field of Search .................. 99/421 H, 421 R, 419,
99/447, 449; 126/9 B, 9 R, 41 B, 9 A, 27;
211/189, 195, 200; 248/150; 403/292

[56] References Cited
U.S. PATENT DOCUMENTS

| | | | |
|---|---|---|---|
| D. 183,005 | 6/1958 | Krause | 99/419 X |
| 2,597,477 | 5/1952 | Haislip | 126/9 B |
| 2,634,674 | 4/1953 | Irwin | 99/419 |
| 2,785,823 | 3/1957 | Zarges | 126/9 R |
| 2,787,996 | 4/1957 | Rumsey | 126/9 R X |
| 3,527,155 | 9/1970 | Renn | 99/421 H |
| 3,648,679 | 3/1972 | Quinn | 126/9 R X |
| 3,712,285 | 1/1973 | Copeland | 126/9 R |
| 3,867,922 | 2/1975 | Dahlquist | 99/447 X |
| 4,324,174 | 4/1982 | Conradt | 126/9 R X |

FOREIGN PATENT DOCUMENTS

| | | | |
|---|---|---|---|
| 482595 | 1/1917 | France | 126/9 R |
| 2389356 | 1/1978 | France | 99/421 H |
| 2387009 | 12/1978 | France | 126/9 B |
| 2498915 | 8/1982 | France | 99/419 |
| 584024 | 1/1977 | Switzerland | 126/9 R |

Primary Examiner—Billy J. Wilhite
Assistant Examiner—Christine A. Peterson
Attorney, Agent, or Firm—Richard L. Ward

[57] ABSTRACT

A free-standing combination rotisserie and shish kebab accessory is provided which includes a three-walled box having a pair of wire frame members such that the two end walls fold flat for storage when the side wall is removed. A motor driven spit can be adpated for use as either a rotisserie or a shish kebab dependent on the use of meat supporting holders or skewer supporting wire wheels.

2 Claims, 4 Drawing Figures

COMBINATION ROTISSERIE-SHISH KEBAB ACCESSORY

BACKGROUND OF THE INVENTION

The cooking of food, such as roasts, on a spit in a rotisserie and on skewers, such as shish kebab, has been adapted to modern cooktops. Typically, supports, such as brackets, are provided for supporting the spit of a rotisserie and the skewers of a shish kebab over a heat source such as a resistance electric heating element. The spit or skewers are rotated slowly by an electric motor. Since skewers represent individual servings, several skewers would be driven simultaneously through a gear train. Additionally, a heat reflecting cover can be used in combination with the rotisserie to speed the cooking time.

Although generally satisfactory for cooking, the prior art rotisserie and shish kebab accessories present storage problems because they are separate units and have a number of loose parts. While the heat reflecting cover speeds the cooking time and tends to protect nearby cabinets, etc., from the radiant heat, it also interferes with air circulation, particularly in a proximity ventilation system. Also, because shish kebab skewers are spread out they tend to be subject to inconsistent cooking dependent upon the relative location of the heating element(s) and a cover is not generally used because of the spread out nature of the shish kebab skewers as compared to a roast on a spit.

SUMMARY OF THE INVENTION

The present invention is directed to a free-standing combination rotisserie and shish kebab accessory consisting of a three-walled box held together by two wire frames such that the side wall is removable and the two end walls fold flat for storage by pivoting around the wire frames. The side wall can be used on either side so that the accessory can be placed on either side of the vent for a proximity ventilation system with the open side facing the vent. One end wall has slots for mounting the spit drive motor and the other end wall is notched to support the free end of the spit. The walls shield the nearby cabinets and motor from the radiant heat and have bright surfaces to reflect the radiant heat toward the food being cooked. Meat holders, in the case of the rotisserie, or skewer supporting wire wheels, in the case of the shish kebab, are removably secured in place on the spit. The spit together with any attachments is rotated by the spit drive motor.

It is an object of this invention to provide a combination rotisserie-shish kebab accessory.

It is a further object of this invention to provide a self-contained rotisserie-shish kebab accessory which can be moved as a unit.

It is an additional object of this invention to provide a rotisserie-shish kebab accessory which is easy to clean, store, assemble and disassemble. These objects, and others as will become apparent hereinafter, are accomplished by the present invention.

Basically, the end walls of a rotisserie-shish kebab accessory support the spit and the motor drive therefor. A side wall is selectively located to provide a right or left hand opening as well as to hold the pivotable end walls in the working or use position. The accessory is movable as a unit to permit loading and unloading. The unit is driven through the spit which selectively receives positionable meat holders or wire wheels for holding the food in place.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
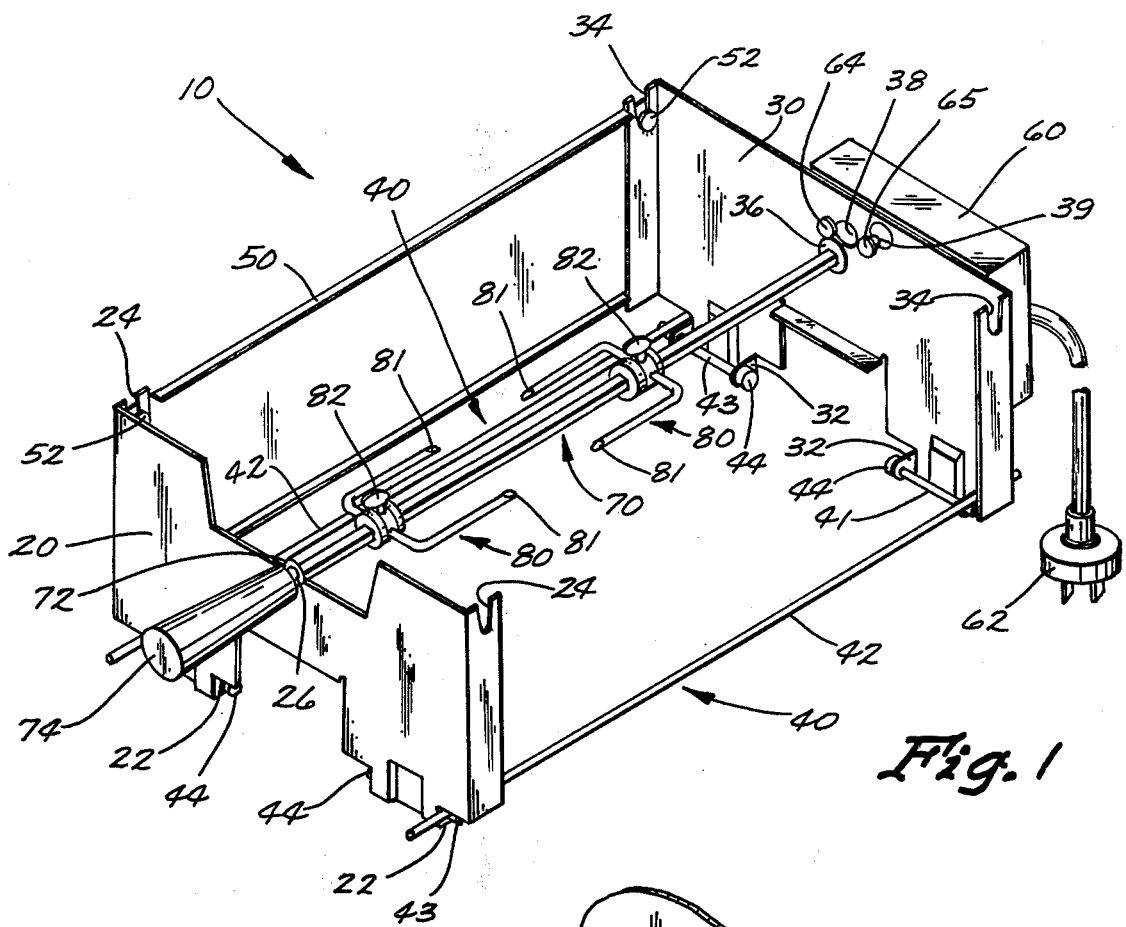
FIG. 1 is an isometric view of the present invention for use as a rotisserie.
Figure 2:
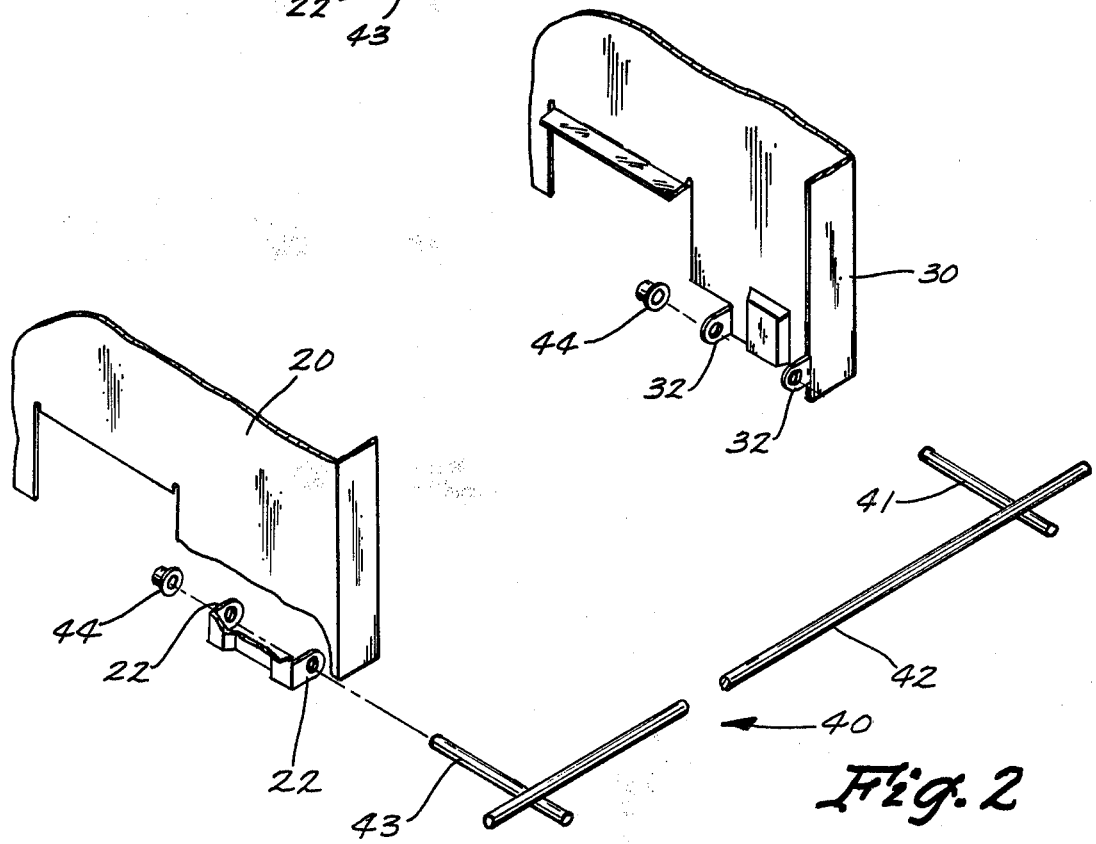
FIG. 2 is an exploded view showing the details of the wire support.

In FIG. 1, the numeral 10 generally designates a rotisserie-shish kebab accessory arranged for use as a rotisserie. The accessory 10 includes a first end piece 20 designated the spit stand and a second end piece 30 designated the motor stand. The end pieces or panels 20 and 30 are pivotally mounted on wire supports 40. As is best shown in FIG. 2, each of the wire supports 40 is made up of three wires, 41, 42 and 43, welded together so that wires 41 and 43 are parallel to each other and at right angles to wire 42. Wires 41 and 43 serve as shafts or axles for rotatably supporting end pieces 20 and 30. End piece 20 has four apertured projections 22 formed as two pairs with each pair being pivotally mounted on axially aligned wires 41 and 43 and held in place by a shaft retainer 44. Similarly, end piece 30 has four apertured projections 32 formed as two pairs with each pair being pivotally mounted on axially aligned wires 41 and 43 and held in place by a shaft retainer 44. Absent some form of restraint, end pieces 20 and 30 can pivot to engage wire supports 40 and thereby fold flat and generally parallel with wires 42 of wire supports 40 for storage. End pieces 20 and 30 are each provided with a pair of slots 24 and 34, respectively. Side shield or panel assembly 50 is provided with a pair of shoulder rivets 52 which are adapted to be received in corresponding slots 24 and 34 to hold end pieces 20 and 30 in place. As is readily apparent in FIG. 1, the slots 24 and 34 and rivets 52 permit the side shield assembly 50 to be placed on either side of the end pieces 20 and 30, as desired.

Figure 4:
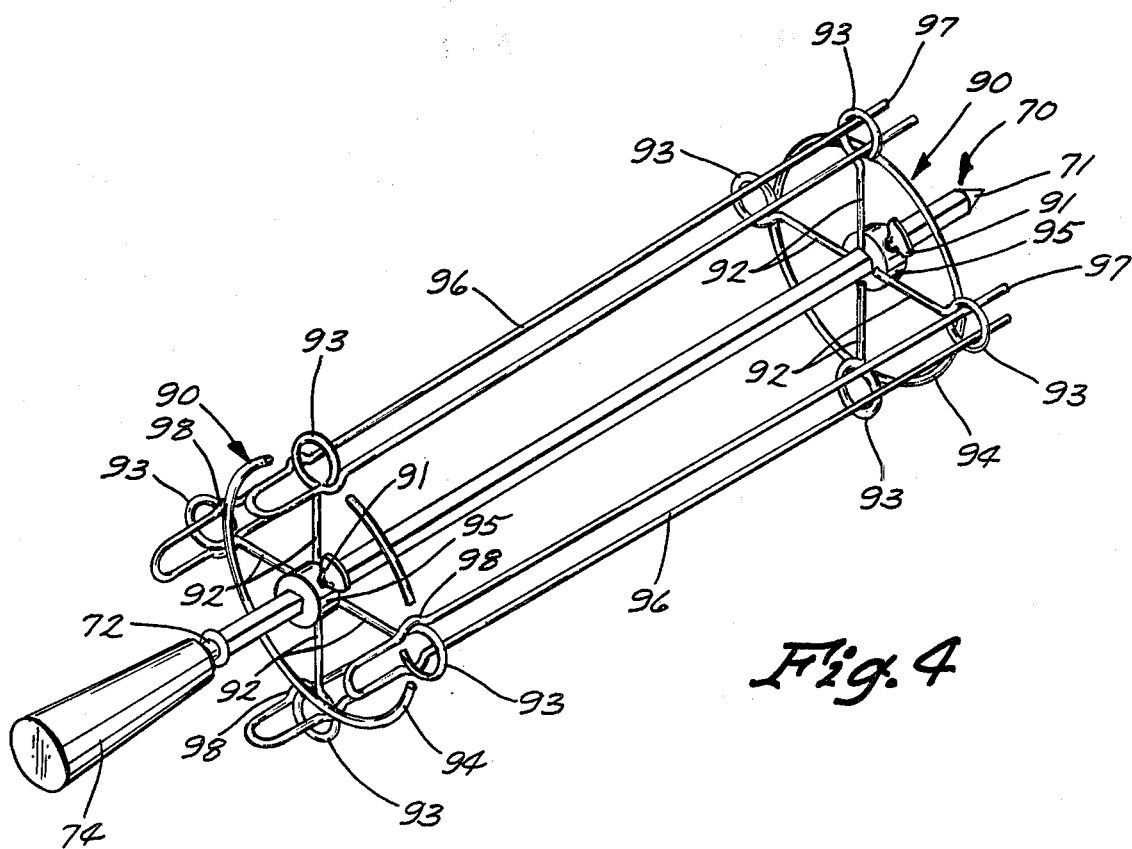
FIG. 4 is an isometric view of the spit in the FIG. 3 configuration.

Drive unit or motor 60 is removably mounted on motor stand or end piece 30 by means of mounting studs 64 and 65 which are received in mounting slots 38 and 39, respectively. Spit 70, as best seen in FIG. 4, is pointed and of a square cross section. Referring now to FIG. 1, the pointed end 71 of the spit 70 passes through opening 36 in end piece 30 and is engagingly received in motor 60. Bearing 72 is located adjacent handle 74 of the spit 70 and is rotatably received in slot 26 in end piece 20 when the spit 70 is engagingly received in motor 60. Spit 70 is driven by motor 60 when the present invention is used as a rotisserie or a shish kebab. For use as a rotisserie, as shown in FIG. 1, a meat holder 80 is placed on spit 70 with pointed ends 81 pointing away from handle 74. The meat holder 80 is positioned in accordance with the size of the roast or other portion of meat to be cooked and is secured in place by tightening thumb screw 82. The pointed end 71 of the spit 70 is inserted into the roast (not illustrated) and slid along the spit 70 until pointed ends 81 of the meat holder 80 are forced into the roast. A second meat holder 80 is placed on spit 70 with the pointed ends 81 pointing towards the handle 72 and roast. The second meat holder 80 is positioned on spit 70 so that the pointed ends 81 of the meat holder 80 are secured in place by tightening thumb screw 82. The spit 70 with the roast secured in place can then be connected to the motor 60 by inserting pointed end 71 into the motor and positioning bearing 72 in slot 26. If the accessory 10 is not already located in place on a cooktop, the accessory 10 can be moved, as a unit, into place. Plug 62 can be inserted into an electrical outlet and motor 60 started. Motor 60 will then drive spit 70 so that it rotates slowly. The control of the cooking element(s) (not illustrated) will be regulated by the person doing the cooking. When the roast is done, the spit 70 can be removed from motor 60 and the roast removed for serving. The motor 60 would be shut off and/or unplugged. When the parts of the assembly 10 have cooled sufficiently, the motor 60 can be detached and the remaining parts washed. Generally, side shield 50 will be detached from the other members and end pieces 20 and 30 would be folded flat for storage.

Figure 3:
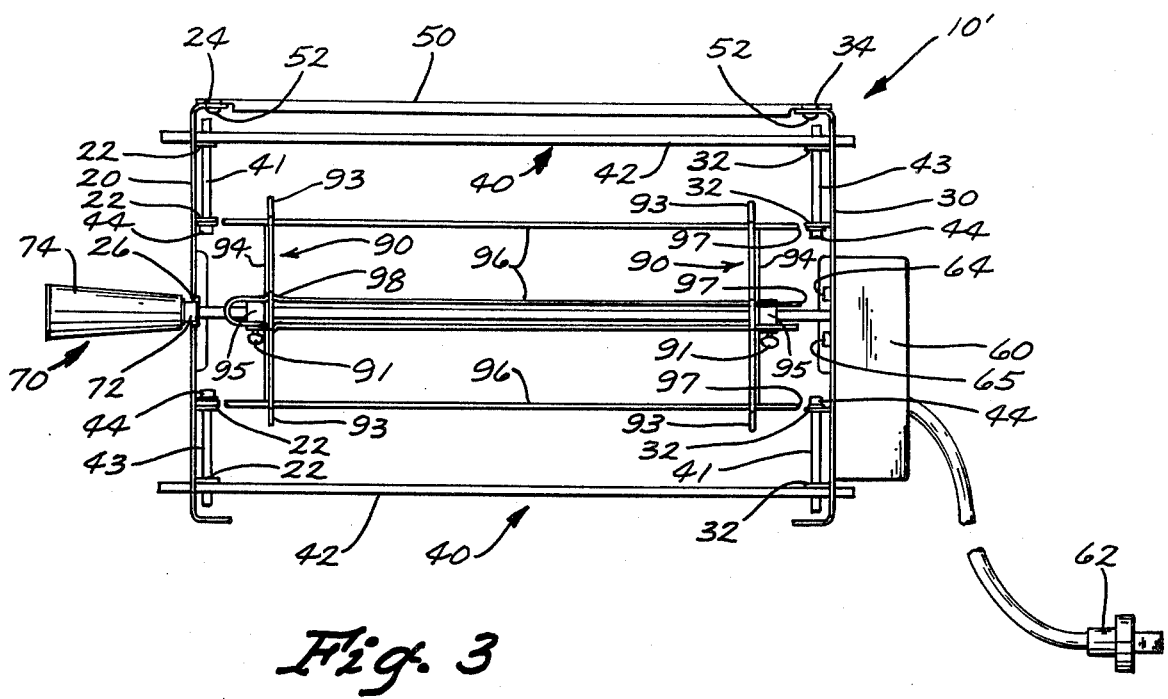
FIG. 3 is a top view of the present invention for use in making shish kebab.

When the present invention is to be used as a shish kebab, the only changes to be made to the accessory 10 of FIG. 1 is the replacement of meat holders 80 with locking rings 90 and the addition of skewers 96. Referring now to FIGS. 3 and 4, the locking rings 90 are placed on spit 70 and secured in place by tightening thumb screws 91. The positioning of locking rings 90 on the spit 70 can be aided by the providing of markings such as grooves (not illustrated) on the spit 70 at the proper locations. The locking rings 90 each have, typically, four radially extending arms 92 terminating in an eye 93. A circular wire member 94 is welded to the arms 92 radially inward of the middle of eyes 93 for reasons to be explained hereinafter. The arms 92 can be welded, placed in holes or otherwise suitably secured to hub 95. Skewers 96 are of an elongated U-shape with pointed ends 97 and a diverging section 98 located near the bight of the skewer 96. For use as a shish kebab, the food is placed on skewer 96 by forcing pointed ends 97 into the food. With a skewer 96 suitably loaded with food, the pointed ends 97 of the skewer 96 are inserted into an eye 93 of the locking ring 90 nearest the pointed end 71 of the spit 70. The diverging section 98 of the skewer 96 is then aligned with the corresponding eye 93 of the locking ring 90 nearest the handle 74 of the spit 70 and snapped into place over the eye 93 with the skewer 96 resting on the wire member 94. This procedure is repeated until the desired number of skewers are in place. As in the case of the rotisserie, the loaded spit with the skewers 96 in place is connected to the motor 60 by inserting pointed end 71 into the motor and positioning bearing 72 in slot 26. If the accessory 10' is not already located in place on a cooktop, the accessory 10' can be moved, as a unit, into place. Plug 62 can then be inserted into an electrical outlet and motor 60 started. The motor 60 will drive spit 70 so that it rotates slowly. Because skewers 96 are U-shaped, the food is not able to move relative to the skewer and because the diverging section 98 is snapped in place over an eye 93 and rests against the wire member 94, the skewer is not able to move relative to the locking rings 90 and spit 70. The control of the cooking element(s) (not illustrated) will be regulated by the person doing the cooking. When the shish kebab is done, the spit 70 can be removed from motor 60 and the skewers snapped off of the eye 93 and removed from locking rings 90. The accessory 10' would then be cleaned and stored as previously described. Because end pieces 20 and 30 and side shield 50 are each provided with a bright finish, they reflect radiant heat to speed cooking and are easier to clean.

Although a preferred embodiment of the present invention has been illustrated and described, other changes will occur to those skilled in the art. It is therefore intended that the present invention is to be limited only by the scope of the appended claims.

I claim:

1. A free-standing combination rotisserie and shish kebab accessory comprising: a pair of support means each having first and second spaced axles; first substantially imperforate and brightly finished end piece means having first mounting means and pivotally mounted on said first axle of each of said support means with said first axles being in axial alignment; second substantially imperforate and brightly finished end piece means having second mounting means and pivotally mounted on said second axle of each of said support means with said second axles being in axial alignment; substantially imperforate and brightly finished side piece means adapted to be selectively, removably secured to said first and second end piece means to selectively permit or prevent pivotal movement of said first and second end piece means; drive means adapted to be removably secured to said first mounting means; spit means adapted to selectively engage said drive means and to be rotated thereby; bearing means on said spit means and adapted to be supportingly received in said second mounting means; and food holding means for securing food to said spit means including a pair of locking ring means each comprising a hub, a plurality of radially extending arms secured to said hub and terminating in a generally circular eye, a circular support secured to said arms radially inward of the center of said eyes, means for securing said locking ring means to said spit means, and a plurality of elongated U-shaped skewers each having a diverging section for snapping over one of said eyes into contact with said circular support.

2. A free-standing combination rotisserie and shish kebab accessory comprising: a supporting framework including a pair of support members, a pair of panels pivotally mounted on said support members and movable from a folded storage posture to a working posture, and means for locking said panels in said working posture; drive means supported on said framework; spit means having one end selectively engageable with said drive means and the opposite end supportingly recieved by an opposite portion of said framework and rotatable by said drive means; and means for securing food to said spit means including a pair of locking rings each having hub means slidably engageable with said spit means, a plurality of arms extending radially from said hub means and terminating in a generally circular eye, a generally circular support attached to said arms radially inward of the center of said eyes, locking means associated with said hub means for securing said locking ring to said spit means, said means for securing food further including a plurality of elongated substantially U-shaped skewers each having a diverging section at one end for snapping over one of said eyes and into contact with said circular support and pointed opposite ends for passing through a substantially aligned eye on the other of said locking rings whereby said U-shaped skewers are locked between said pair of locking rings.

* * * * *